United States Patent
Korten et al.

(10) Patent No.: US 11,468,176 B2
(45) Date of Patent: Oct. 11, 2022

(54) COMPUTER METHOD AND GRAPHICAL USER INTERFACE FOR IDENTITY MANAGEMENT USING BLOCKCHAIN

(71) Applicant: PASIG AND HUDSON, PVT LIMITED, Singapore (SG)

(72) Inventors: Carlos W. Korten, Natick, MA (US); Dhiraj Rattan, Gilbert, AZ (US); Cory Moreira, Palm Harbor, FL (US)

(73) Assignee: PASIG AND HUDSON, PVT LIMITED, Singapore (SG)

( * ) Notice: Subject to any disclaimer, the term of this patent is extended or adjusted under 35 U.S.C. 154(b) by 155 days.

(21) Appl. No.: 16/706,520

(22) Filed: Dec. 6, 2019

(65) Prior Publication Data
US 2020/0184085 A1    Jun. 11, 2020

Related U.S. Application Data

(60) Provisional application No. 62/776,214, filed on Dec. 6, 2018.

(51) Int. Cl.
| | |
|---|---|
| G06F 21/00 | (2013.01) |
| G06F 21/60 | (2013.01) |
| G06F 21/40 | (2013.01) |
| G06F 21/62 | (2013.01) |
| H04L 9/06 | (2006.01) |

(52) U.S. Cl.
CPC ............ G06F 21/602 (2013.01); G06F 21/40 (2013.01); G06F 21/6245 (2013.01); H04L 9/0637 (2013.01)

(58) Field of Classification Search
None
See application file for complete search history.

(56) References Cited

U.S. PATENT DOCUMENTS

| | | | |
|---|---|---|---|
| 9,635,000 B1* | 4/2017 | Muftic | ................ H04L 9/3239 |
| 2013/0205136 A1* | 8/2013 | Kirsch | ..................... H04L 9/30 |
| | | | 713/168 |
| 2016/0328713 A1 | 11/2016 | Ebrahimi | |

FOREIGN PATENT DOCUMENTS

| | | |
|---|---|---|
| KR | 1020180113084 | 10/2018 |
| KR | 1020180129028 | 12/2018 |

OTHER PUBLICATIONS

PCT International Search Report and Written Opinion dated Apr. 3, 2020, for PCT International Patent Application No. PCT/US2019/065082 filed Dec. 6, 2019, 13 pages.

* cited by examiner

*Primary Examiner* — Andrew J Steinle
(74) *Attorney, Agent, or Firm* — Launchpad Intellectual Property, Inc.; Christopher A. Wiklof

(57) ABSTRACT

According to embodiments, possession of a private key is replaced with possession of a registered personal electronic device, such as a smartphone, as proof of identity. Registration on a blockchain includes publishing a person's public key and registering the person's IMEI (Hardware ID) Hash, according to an embodiment. Registration on the blockchain gives others a way to verify that a transaction was signed by the person and sent from the person's personal electronic device by transmitting a challenge message to the person as a digital challenge, and verifying that the person possesses a corresponding private key by responding with an encrypted message that can be decrypted to display the original message.

16 Claims, 17 Drawing Sheets

COMPUTER METHOD AND GRAPHICAL USER INTERFACE FOR IDENTITY MANAGEMENT USING BLOCKCHAIN

CROSS REFERENCE TO RELATED APPLICATIONS

The present application claims priority benefit from U.S. Provisional Patent Application No. 62/776,214, entitled "COMPUTER METHOD FOR IDENTITY MANAGEMENT USING BLOCKCHAIN," filed Dec. 6, 2018 which, to the extent not inconsistent with the disclosure herein, is incorporated by reference.

SUMMARY

A computer method for establishing a secure identity (ID) and graphical user interface (GUI) therefor includes presenting, on an electronic display (e.g., of a personal electronic device such as a mobile phone, tablet, personal computer, smart home device or the like), a GUI including one or more entry fields for receiving a global ID, an actual name, and a designation of one or more ID proof references from a particular person. The computer method includes receiving, via the GUI, inputs including the global ID, the actual name, and the one or more ID proof references associated with the particular person, transmitting, into a computer memory of a server computer, the global ID, the actual name, and the one or more ID proof references associated with the particular person, and transmitting, from a personal electronic device associated with the particular person into the computer memory of the server computer, a verified identifier of the personal electronic device. The computer method includes generating, in the server computer or the personal electronic device, at least one private key associated with the global ID, and generating, in the server computer or the personal electronic device, at least one public key associated with the global ID. The computer method includes encrypting the actual name, the personal electronic device identifier, and the one or more ID proof references as encrypted ID data using the private key, and immutably storing, in a plurality of non-transitory computer readable memories, access information for the global ID, the encrypted ID data, and the at least one public key for decrypting an ID verification.

According to an embodiment, a computer method for establishing a secure global identity (ID) includes receiving, into a computer memory of a server computer, a global ID associated with a particular person; receiving, into the computer memory, an actual name of the particular person; and receiving, into the computer memory, a verified identifier (e.g., an IMEI) of a personal electronic device associated with the particular person. A first plurality of ID proof references associated with the particular person are received into the computer memory. The computer method includes generating at least one private key associated with the global ID and generating at least one public key associated with the global ID. The computer method includes using the private key to encrypt the actual name, the personal electronic device identifier, and the first plurality of ID proof references as encrypted ID data; and immutably storing the global ID, the encrypted ID data, and the at least one public key for decrypting an ID verification in a plurality of non-transitory computer readable memories. Immutably storing the global ID, the encrypted ID data, and the at least one public key for decrypting an ID verification in a plurality of non-transitory computer readable memories may include immutably storing the global ID, the encrypted ID data, and the at least one public key for decrypting an ID verification in a blockchain carried by the plurality of non-transitory computer readable memories.

According to an embodiment, a computer method for verifying a secure global ID includes receiving a global ID verification challenge from a counterparty via a network interface, reading encrypted ID data from one or more non-transitory computer readable memories, parsing the encrypted ID data to obtain a verified identifier of a personal electronic device corresponding to the global ID, and transmitting the global ID verification challenge to the personal electronic device. Upon receipt, the person to whom the global ID corresponds may respond to the global ID verification challenge by providing an input to the personal electronic device via a graphical user interface (GUI). A local application may transmit the response to a server computer, which receives an acknowledgement of the global ID verification challenge. Upon receipt of the response, the server computer transmits a response to the global ID verification challenge to the counterparty. Reading encrypted ID data from one or more non-transitory computer readable memories may include reading a blockchain carried by the plurality of non-transitory computer readable memories.

DETAILED DESCRIPTION

Figure 1:
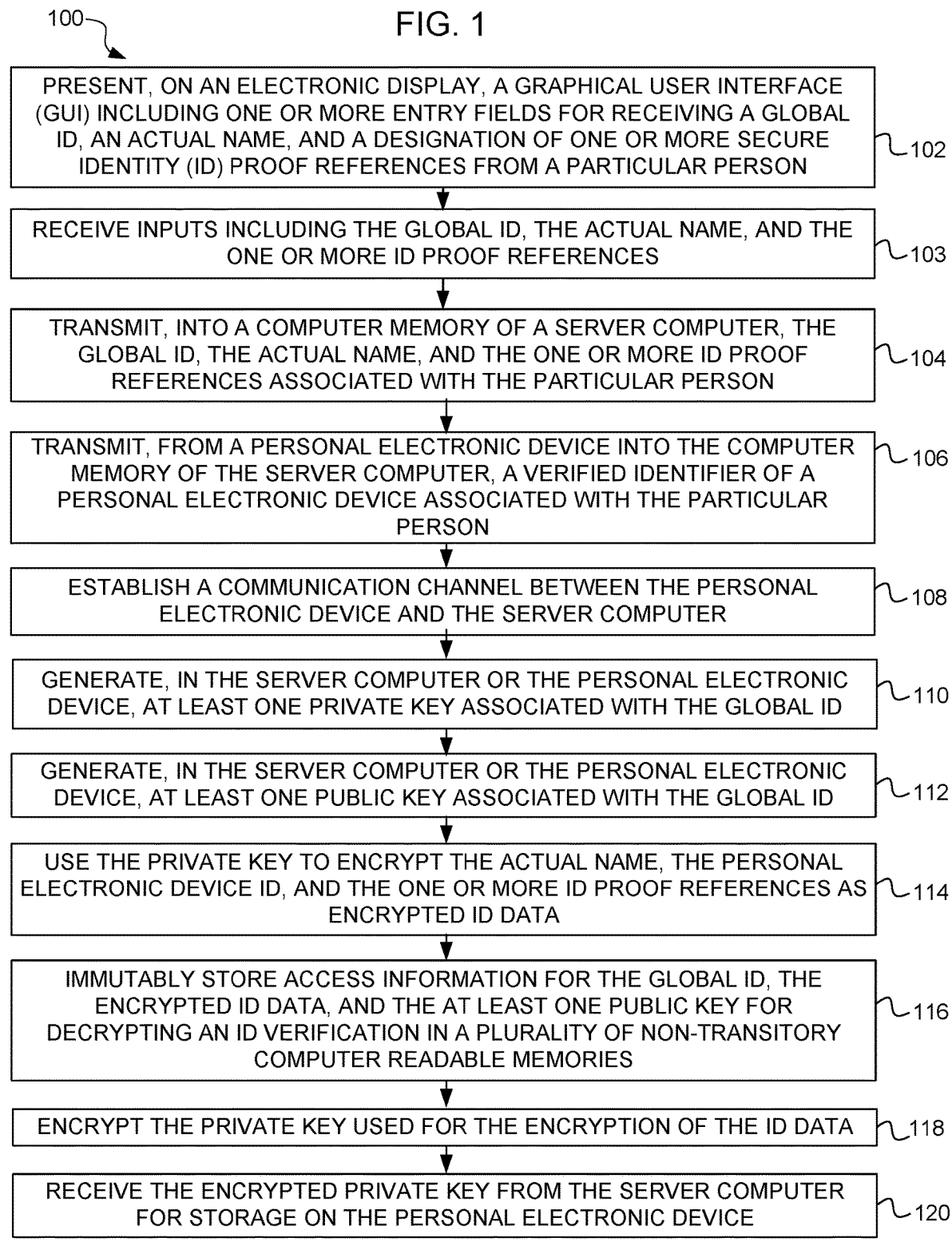
FIG. 1 is a flow chart showing a computer method for establishing a secure identity (ID) using a graphical user interface (GUI) therefor, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

In everyday life, there are situations where proof of identity is needed. Some examples include instances such as unlocking one's hotel room, starting one's car, entering a secured facility, applying for a loan, applying for a job, boarding an airplane, proving one's citizenship, accessing one's checking account, charging an expense to one's company, and endorsing a document.

According to embodiments, a decentralized platform using blockchain technology may provide proof of identity with a secure, encrypted digital token stored on a person's personal device. Illustrative UI/UX designs may support:
  signing any legal document from your mobile phone,
  applying for mortgages, loans and insurance using one click,
  replacing all one's usernames with a fingerprint,
  entering secured facilities by presenting one's mobile phone,
  control who can see one's sensitive and secure medical, financial and legal information,
  paying online without entering any credit card numbers,
  providing digital proof of residence, employment, citizenship, insurance and title, and/or
  securing all one's private keys, including cryptocurrency wallets.

According to embodiments, the identity platform may include one or several of the following aspects:
  Identity Token: A person's mobile phone registered on a blockchain as a secure digital proxy for the person.
  Bilateral Digital Signatures With Custody: Trustless protocol to share sensitive data, with cryptographic proof on every transaction.
  Self-Sovereign Data Network: Network of Institutions to share sensitive data, with ad hoc and on-demand permissions. (Data should be self-sovereign, meaning that an individual has authority to determine uses of his data. This may use a decentralized, permission-based protocol.)
  Probabilistic Affirmation: Proprietary heuristics to govern operations under a paradigm of certain and unavoidable fraud.

FIG. 1 is a flow chart showing a computer method 100 for establishing a secure identity (ID) and graphical user interface (GUI) therefor, according to an embodiment. According to an embodiment, the computer method 100 for establishing a secure ID and GUI therefor includes, in step 102, presenting, on an electronic display, a GUI including one or more entry fields for receiving a global ID, an actual name, and a designation of one or more ID proof references from a particular person. Step 103 includes receiving, via the GUI, inputs including the global ID, the actual name, and the one or more ID proof references associated with the particular person. Step 104 includes transmitting, into a computer memory of a server computer, the global ID, the actual name, and the one or more ID proof references associated with the particular person. Step 106 includes transmitting, from a personal electronic device associated with the particular person into the computer memory of the server computer, a verified identifier of the personal electronic device (typically, this is the device that the electronic display is a part of). Step 110 includes generating, in the server computer or the personal electronic device, at least one private key (encryption key) associated with the global ID. Step 112 includes generating, in the server computer or the personal electronic device, at least one public key (decryption key) associated with the global ID. Step 114 includes, using the private key, encrypting the actual name, the personal electronic device identifier, and the one or more ID proof references as encrypted ID data. Step 116 includes immutably storing, in a plurality of non-transitory computer readable memories, access information for the global ID, the encrypted ID data, and the at least one public key for decrypting an ID verification.

According to an embodiment, the step of immutably storing access information for the global ID, the encrypted ID data, and the at least one public key for decrypting an ID verification in the plurality of non-transitory computer readable memories, in step 116, includes immutably storing access information for the global ID and the at least one public key for decrypting the ID verification in a blockchain carried by a plurality of non-transitory computer readable memories, storing the encrypted ID data in a networked storage facility, and storing an access coordinate for the encrypted ID data in the blockchain carried by the plurality of non-transitory computer readable memories. According to an alternative embodiment, the step of immutably storing access information for the global ID, the encrypted ID data, and the at least one public key for decrypting the ID verification in the plurality of non-transitory computer readable memories, in step 116, includes immutably storing access information for the global ID in a blockchain carried by the plurality of non-transitory computer readable memories, and storing the at least one public key for decrypting the ID verification and the encrypted ID data in a networked storage facility accessed by the blockchain carried by the plurality of non-transitory computer readable memories.

According to an embodiment, the computer method 100 for establishing a secure ID and GUI therefor further includes, in step 108, establishing a communication channel between the personal electronic device and the server computer. In one embodiment, establishing the communication channel between the personal electronic device and the server computer includes transmitting, into the computer memory of the server computer, access data for the personal electronic device. In another embodiment, establishing the communication channel between the personal electronic device and the server computer includes installing, on the personal electronic device, an application configured to receive push notifications from the server computer.

According to an embodiment, the computer method 100 for establishing a secure ID and GUI therefor further includes, in step 118, encrypting the private key used for the encryption of the ID data. Step 120 includes receiving the encrypted private key from the server computer for storage on the personal electronic device. Additionally and/or alternatively, receiving the encrypted private key, in step 120, includes receiving the encrypted private key to an application installed on the personal electronic device.

According to an embodiment, transmitting the global ID, in step 104, includes transmitting a sequence of characters from the personal electronic device to the server computer for querying the sequence of characters to determine that the sequence of characters is not assigned as a global ID, writing the sequence of characters into the server computer memory as the global ID for the user, and outputting, on the electronic display in the GUI, acceptance of the global ID.

According to an embodiment, the personal electronic device is an electronic device secured by a biometric.

According to an embodiment, transmitting the verified identifier of the personal electronic device associated with the particular person, in step 106, includes querying the personal electronic device for a hardware identifier and transmitting the hardware identifier in an encrypted data transmission. In one embodiment, the hardware identifier includes a unique device identifier. In another embodiment, the hardware identifier includes at least one selected from a group consisting of the International Mobile Equipment Identifier (IMEI), Android ID, iPhone ID, WLAN MAC address string, and Bluetooth address string. Additionally and/or alternatively, the hardware identifier includes a SIM card ID.

According to an embodiment, transmitting the one or more ID proof references associated with the particular person, in step 106, includes displaying an ID reference entry form as, or as part of, a GUI displayed on an electronic display of the personal electronic device, receiving a designation of an ID reference type via the GUI, and receiving at least one ID reference attribute via the GUI. In one embodiment, receiving a designation of an ID reference type includes receiving a designation of a physical document, and receiving at least one ID reference attribute includes capturing a digital image of the physical document. The physical document may include a passport. The physical document may include a birth certificate. Additionally and/or alternatively, the physical document may include a Social Security card.

According to an alternative embodiment, receiving a designation of an ID reference type includes receiving a designation of an electronic account, and receiving at least one ID reference attribute includes receiving an account institution and an account number via the GUI. In one embodiment, receiving an account institution includes receiving a credit or debit card issuer. In another embodiment, receiving an account institution includes receiving a bank name or a routing number. Additionally and/or alternatively, receiving a designation of an electronic account includes receiving a designation of an insurance policy, and receiving the account institution includes receiving the name of the insurance company.

According to an embodiment, the computer method 100 for establishing a secure ID and GUI therefor further includes analyzing, with the server computer, the one or more ID proof references associated with the particular person to determine a confidence interval, and displaying the confidence interval to the user via the GUI.

According to an embodiment, encrypting the actual name, the personal electronic device identifier, and the one or more ID proof references as encrypted ID data, in step 114, includes performing a digital hash of the actual name, the personal electronic device identifier, and the one or more ID proof references using the private key.

According to an embodiment, immutably storing access information for the global ID, the encrypted ID data, and the at least one public key for decrypting an ID verification in one or more computer memories, in step 116, includes writing hashed values of the global ID, the encrypted ID data, and the at least one public key for decrypting the ID verification to a blockchain as a transaction. In one embodiment, the blockchain includes a public blockchain. In another embodiment, the public blockchain includes an Etherium blockchain. The Etherium blockchain may include an ERC20 blockchain. Additionally and/or alternatively, the blockchain includes a private blockchain. In another embodiment, the blockchain comprises a permissioned blockchain.

Figure 2:
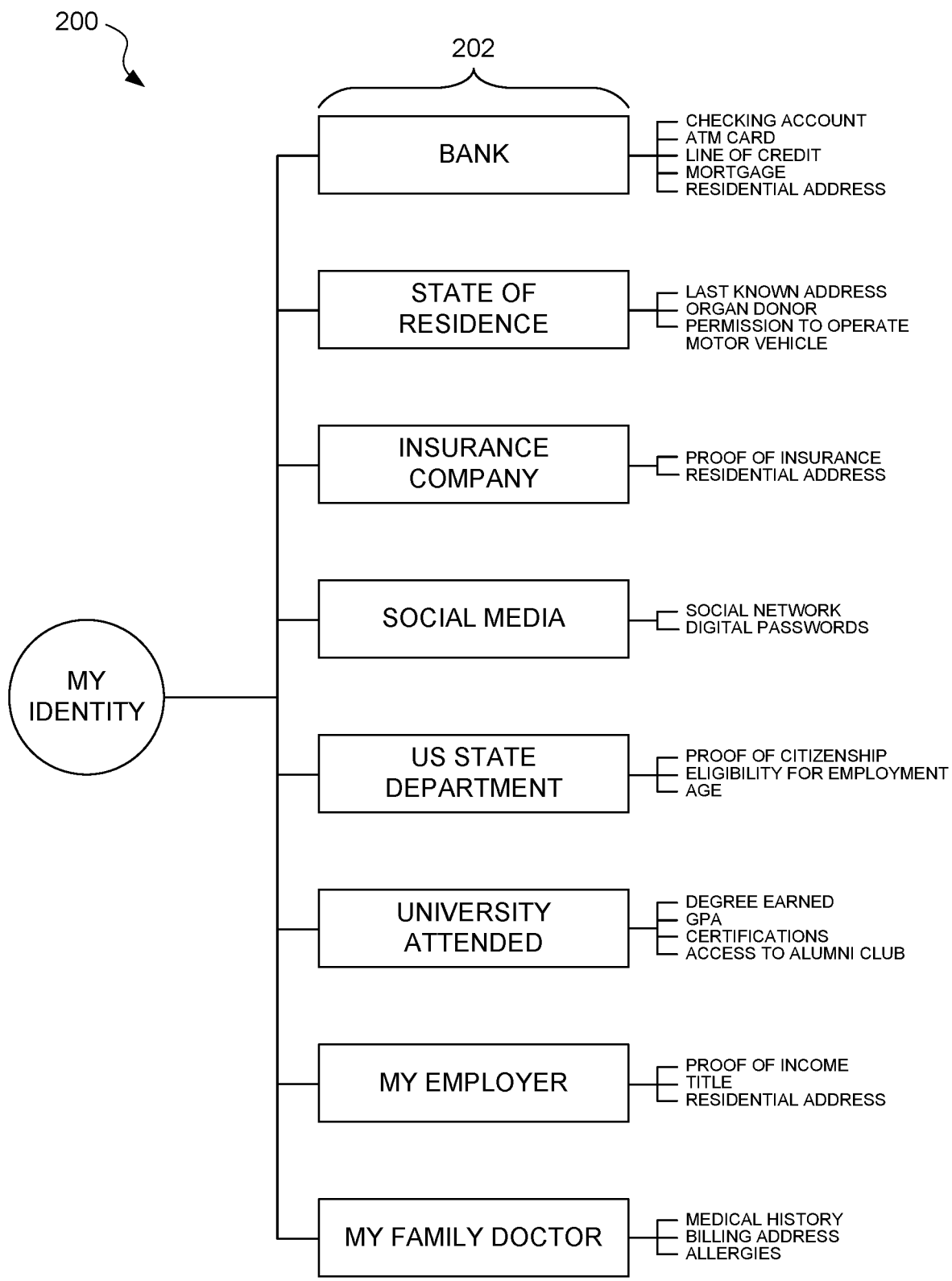
FIG. 2 is a diagram showing several forms of identity (ID) proof references, according to embodiments.

FIG. 2 is a diagram 200 showing several illustrative identity (ID) proof references 202, according to embodiments. The ID proof references 202 may be viewed, collectively, as delegated identity, which may be accessed according to a decentralized, permission-based protocol.

The storage and maintenance of self-sovereign identity data may be delegated to the institutions which are actively engaged in our lives. This may ensure the digital identity is constructed from the most current and highest quality data, rather than stale data. This delegated identity approach also makes identity difficult to hack, since the data spans a network of machines.

Figure 3:
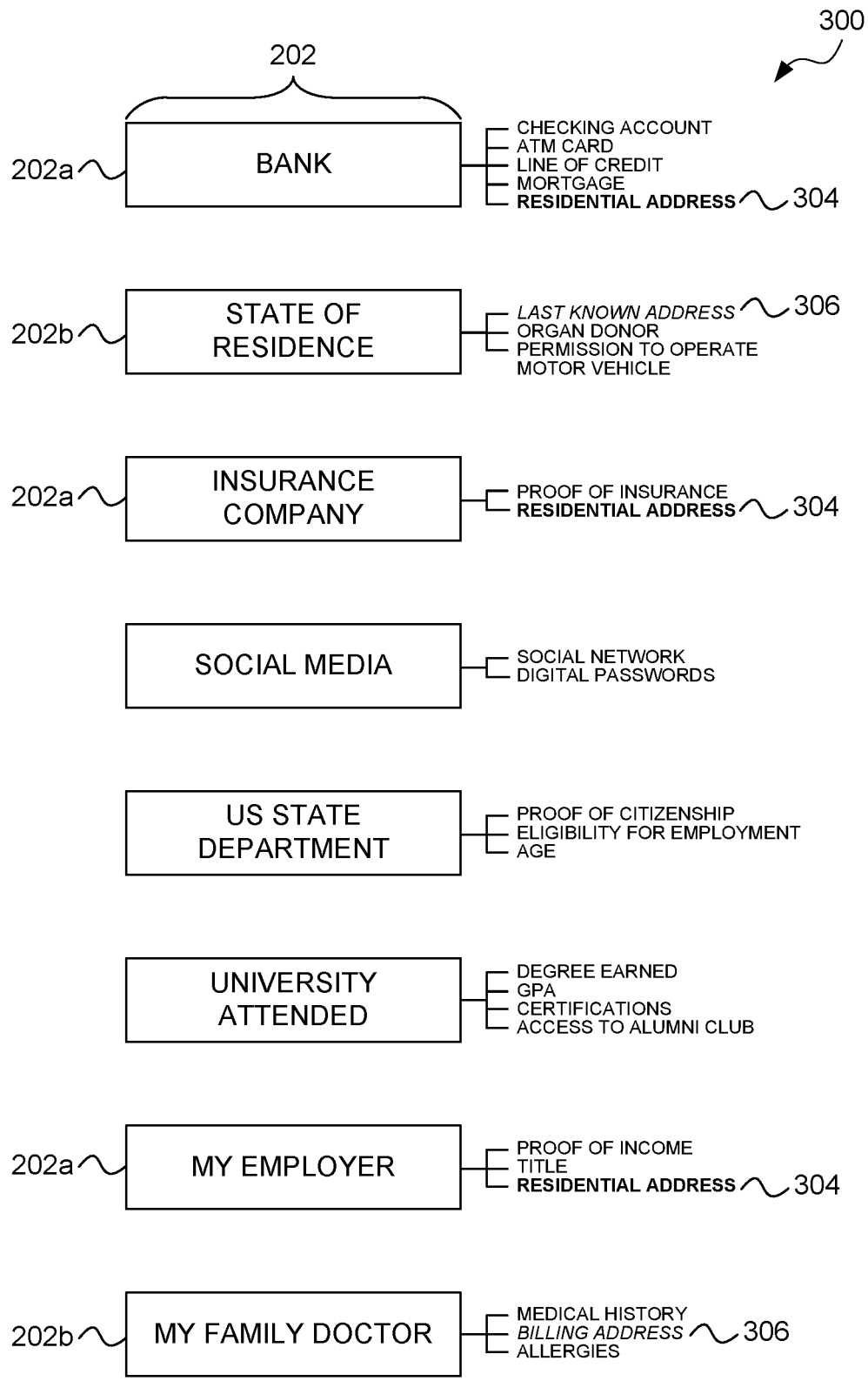
FIG. 3 is a diagram showing attributes of several ID proof references, according to embodiments.

FIG. 3 is a diagram 300 showing cross-referencing between several ID proof references 202, according to embodiments. A consensus opinion may be triangulated by cross-referencing data across multiple institutions, according to embodiments. For example, a residential address 304, 306 associated with a person may be parsed from records maintained or stored in several ID proof reference documents and electronic databases 202*a*, 202*b*. Each affirming ID proof (institution/database/document) reference 202*a* having a common value 304 for an attribute (e.g., residential address) increases the fidelity of the digital identity and reduces the likelihood that the identity is fraudulent. Each non-affirming ID proof reference 202*b* having non-consistent values 306 for the attribute may not increase or may decrease the fidelity of the digital identity and thus increase the likelihood that the identity is fraudulent. The number and/or type of affirming ID proof references 202*a* having a common value 304 versus the number and/or type of non-affirming ID proof references 202*b* having non-consistent values 306 may be used to calculate a confidence interval related to the certainty of the digital identity.

The inventor contemplates several ways of calculating the confidence interval. The confidence interval may be expressed as a percentage 0% to 100%, or as a decimal interval between 0.0 and 1.0, for example. According to an embodiment, the confidence interval may be calculated by assigning a relevance from 0.0 to 1.0 to each ID proof reference (e.g., an institution, a database, and/or a document) 202, multiplying each affirming ID proof reference 202*a* by its relevance to form an affirming ID proof reference relevance, multiplying each non-affirming ID proof reference 202*b* by its relevance to form a non-affirming ID proof reference relevance, and dividing a sum of affirming ID proof reference relevances by a quantity of a sum of ID proof reference non-affirming relevances plus the sum of affirming ID proof reference relevances. This approach may optionally be repeated with other attributes found across plural entities, and the result combined with results for a first attribute to generate the confidence interval. In another embodiment, ID proof references may contribute to increasing a confidence interval whether or not they share a common attribute. Alternatively, other formulas may be used to calculate a confidence interval that aggregates quality, number, and consistency of ID proof references.

Figure 4:
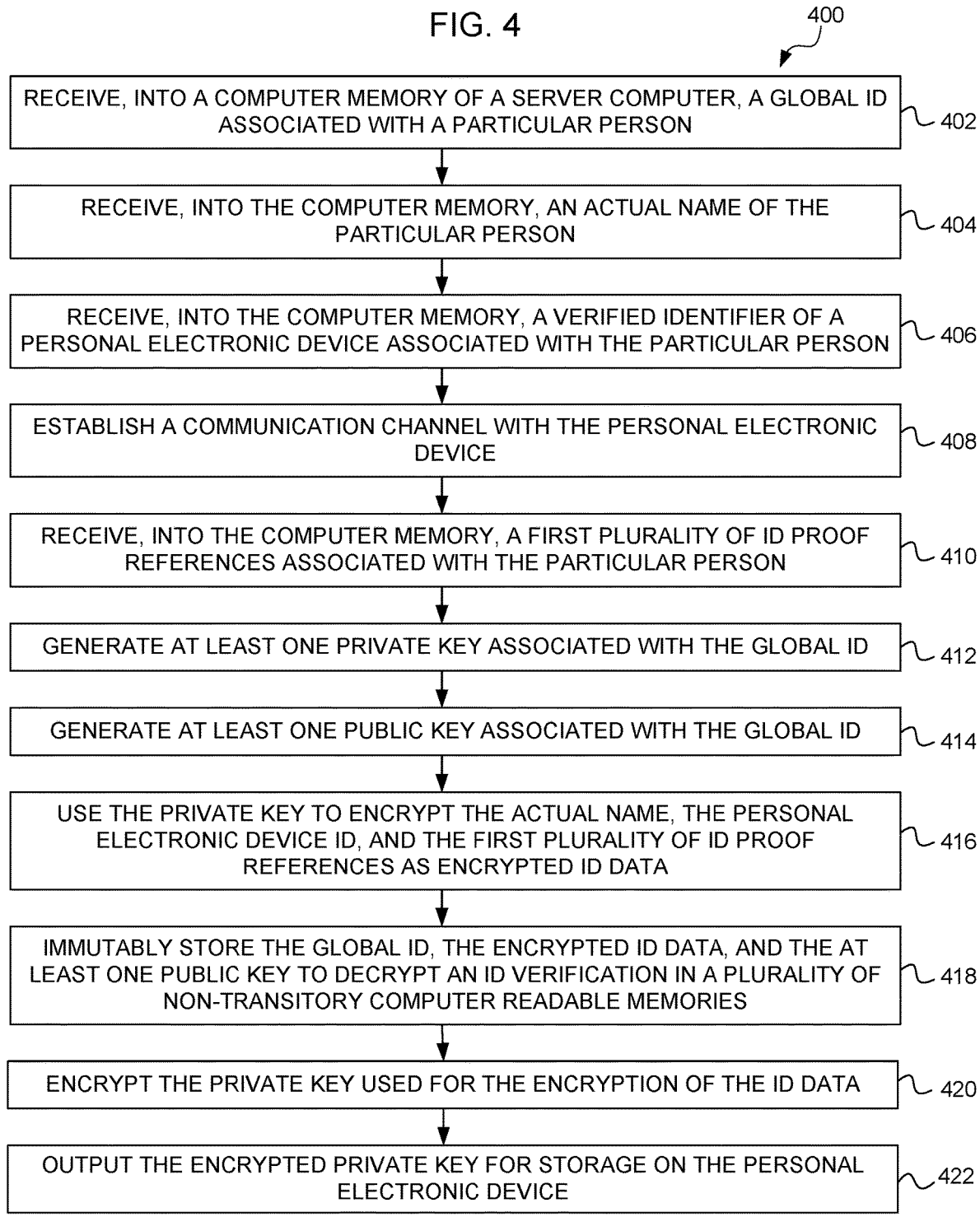
FIG. 4 is a flow chart showing a computer method for establishing a secure ID, according to an embodiment.

FIG. 4 is a flow chart showing a computer method 400 for establishing a secure ID, according to an embodiment.

According to an embodiment, a computer method 400 for establishing a secure identity (ID) includes, in step 402, receiving, into a computer memory of a server computer, a global ID associated with a particular person.

Figure 5:
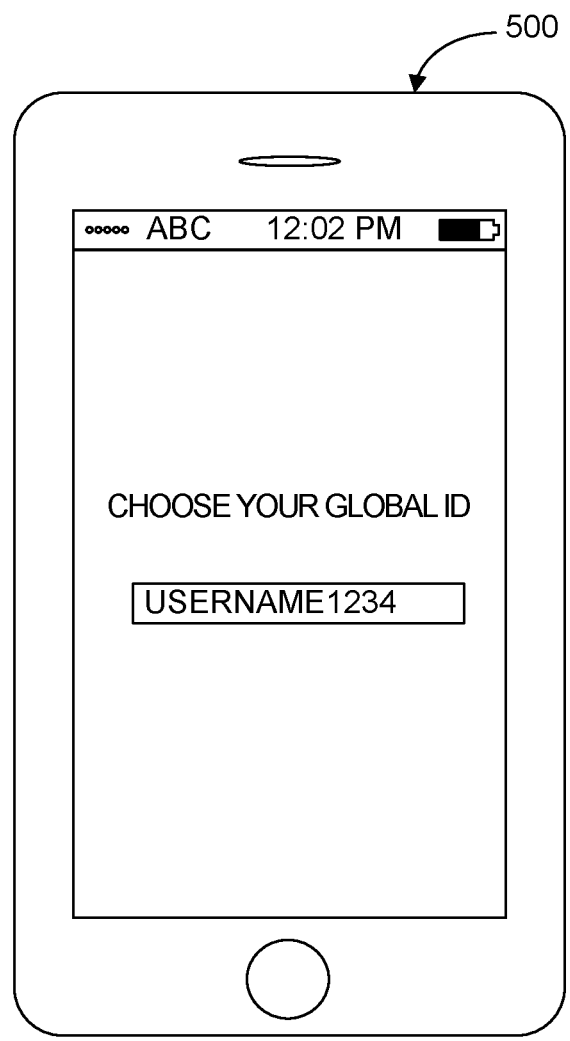
FIG. 5 is a diagram of a graphical user interface (GUI) for receiving a global ID from a user, according to an embodiment.

FIG. 5 is a diagram of a graphical user interface (GUI) 500 for receiving a global ID from a user, according to an embodiment.

Referring again to FIG. 4, step 404 includes receiving, into the computer memory, an actual name of the particular person. Step 406 includes receiving, into the computer memory, a verified identifier of a personal electronic device associated with the particular person. Step 410 includes receiving, into the computer memory, a first plurality of ID proof references associated with the particular person. Step 412 includes generating at least one private key associated with the global ID.

Figure 6:
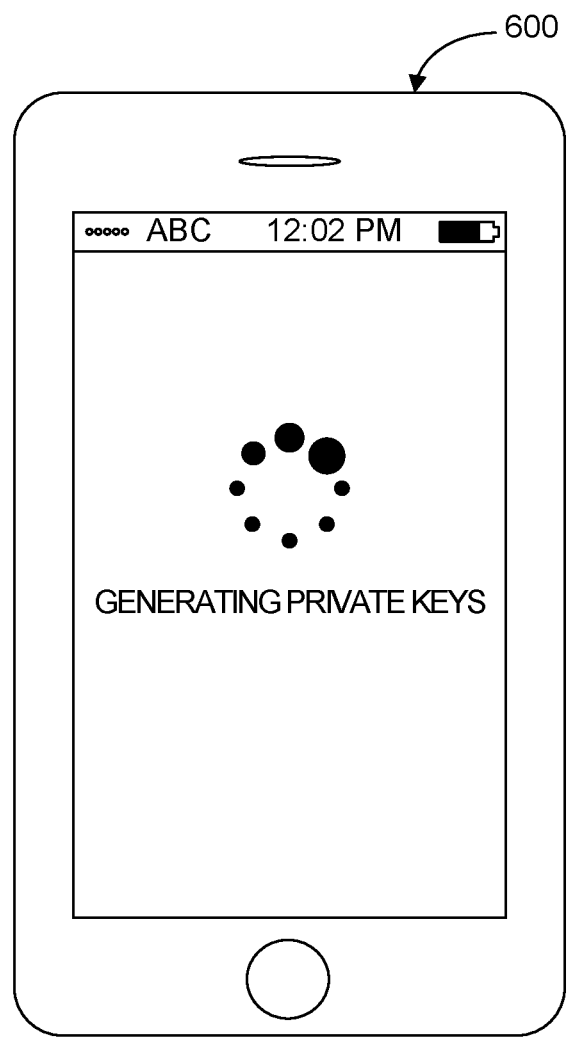
FIG. 6 is a diagram of a GUI that may be displayed to a user during generation of at least one private key, according to an embodiment.

FIG. 6 is a diagram of a GUI 600 that may be displayed to a user during generation of at least one private key, according to an embodiment.

Referring again to FIG. 4, step 414 includes generating at least one public key associated with the global ID.

Figure 7:
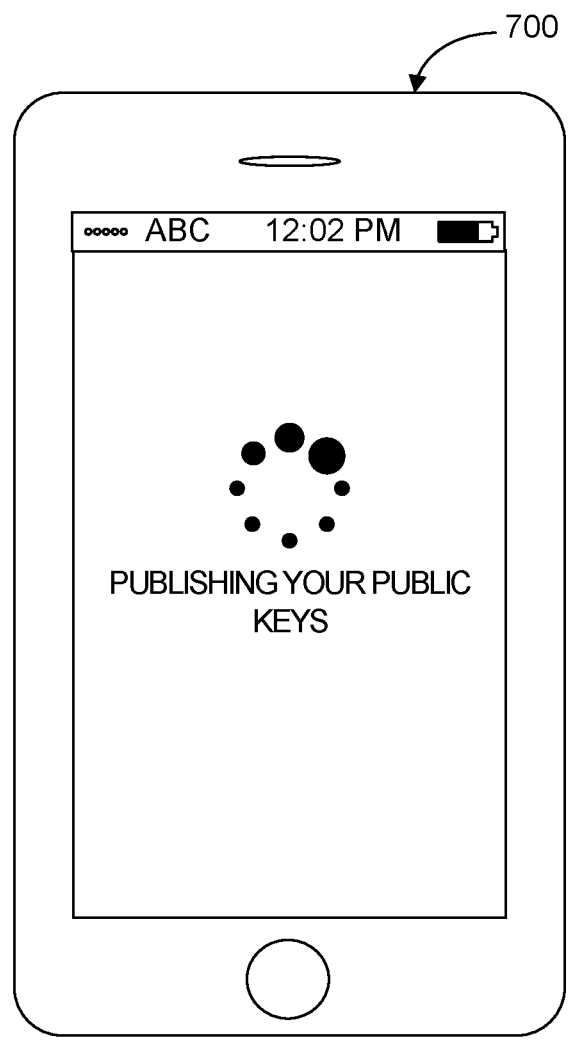
FIG. 7 is a diagram of a GUI that may be displayed to a user during generation of at least one public key, according to an embodiment.

FIG. 7 is a diagram of a GUI 700 that may be displayed to a user during generation of at least one public key, according to an embodiment.

Referring again to FIG. 4, step 416 includes using the private key, encrypting the actual name, the personal electronic device identifier, and the first plurality of ID proof references as encrypted ID data. Step 418 includes immutably storing the global ID, the encrypted ID data, and the at least one public key for decrypting an ID verification in a plurality of non-transitory computer readable memories.

In an embodiment, immutably storing the global ID, the encrypted ID data, and the at least one public key for decrypting an ID verification in the plurality of non-transitory computer readable memories, in step 418, includes immutably storing the global ID, the encrypted ID data, and the at least one public key for decrypting an ID verification in a blockchain carried by the plurality of non-transitory computer readable memories.

According to an embodiment, the computer method 400 further includes, in step 408, establishing a communication channel with the personal electronic device. In one embodiment, establishing a communication channel with the personal electronic device, in step 408, includes receiving, into the computer memory, access data for the personal electronic device. In another embodiment, establishing a communication channel with the personal electronic device, in step 408, includes installing, on the personal electronic device, an application configured to receive push notifications from the server computer.

According to an embodiment, the computer method 400 further includes, in step 420, encrypting the private key used for the encryption of the ID data, and in step 422, outputting the encrypted private key for storage on the personal electronic device. In an embodiment, outputting the encrypted private key includes outputting the encrypted private key to an application installed on the personal electronic device.

Figure 8:
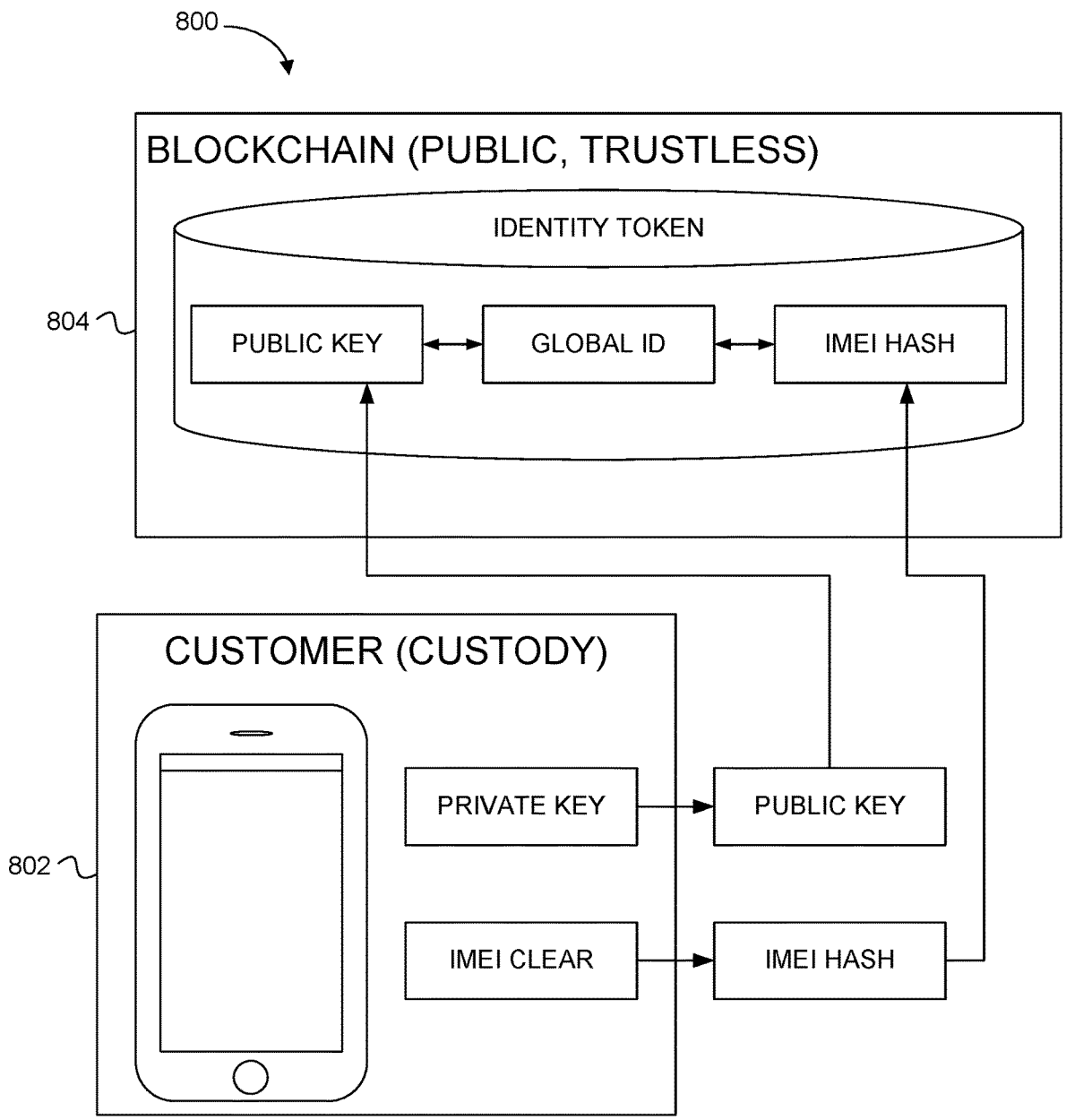
FIG. 8 is a diagram showing relationships between data elements carried by a personal electronic device and a blockchain, according to embodiments.

FIG. 8 is a diagram 800 showing relationships between data elements carried by a personal electronic device 802 and a blockchain 804, according to embodiments.

In an embodiment, referring to FIGS. 4 and 5, receiving the global ID associated with the particular person, in step 402, includes receiving an entry or selection of the global ID via a graphical user interface (GUI) displayed on an electronic display of the personal electronic device.

In one embodiment, receiving the global ID, in step 402, includes receiving a sequence of characters, querying for the sequence of characters to determine that the sequence of characters is not assigned as a global ID, and writing the sequence of characters into the computer memory as the global ID for the user.

In another embodiment, receiving the global ID, in step 402, includes receiving a sequence of characters from a user via a GUI, querying for the sequence of characters to determine that the sequence of characters is already assigned as a global ID, generating one or more alternative sequences of characters that are not already assigned as global IDs, presenting the one or more alternative sequences of characters to the user via the GUI, followed by receiving, from the user via the GUI, a selection of one alternative sequence of characters, and writing the sequence of characters into the computer memory as the global ID for the user.

Referring to FIG. 4, in one embodiment, receiving the actual name of the particular person, in step 404, includes receiving an entry or selection of the actual name via the GUI displayed on the electronic display of the personal electronic device. In another embodiment, receiving the actual name of the particular person, in step 404, includes parsing, from the first plurality of ID proof references associated with the particular person, the actual name of the particular person.

In an embodiment, the personal electronic device is an electronic device secured by a biometric.

In an embodiment, receiving a verified identifier of a personal electronic device associated with the particular person, in step 406, includes querying the personal electronic device for a hardware identifier and receiving the hardware identifier in an encrypted data transmission.

In an embodiment, the hardware identifier may include a unique device identifier. In an embodiment, the hardware identifier may include at least one selected from a group consisting of the International Mobile Equipment Identifier (IMEI), Android ID, iPhone ID, WLAN MAC address string, and Bluetooth address string. In an embodiment, the hardware identifier may include a SIM card ID.

Figure 9:
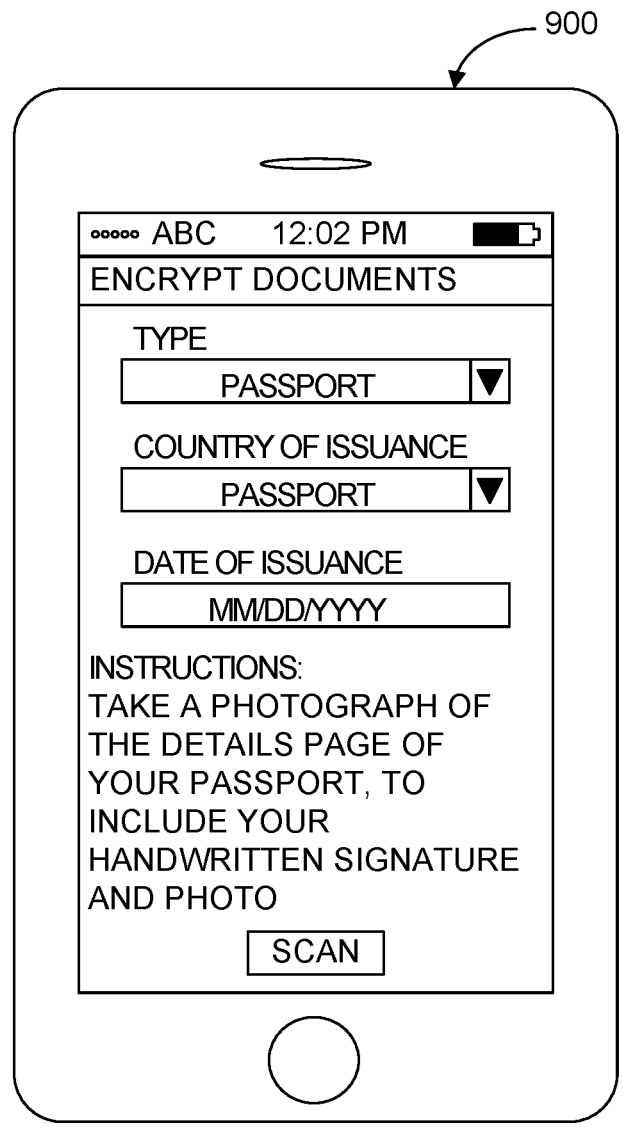
FIGS. 9 and 10 are diagrams of a GUI for receiving a first plurality of ID proof references, where the ID proof reference is a physical document, according to embodiments.
Figure 10:
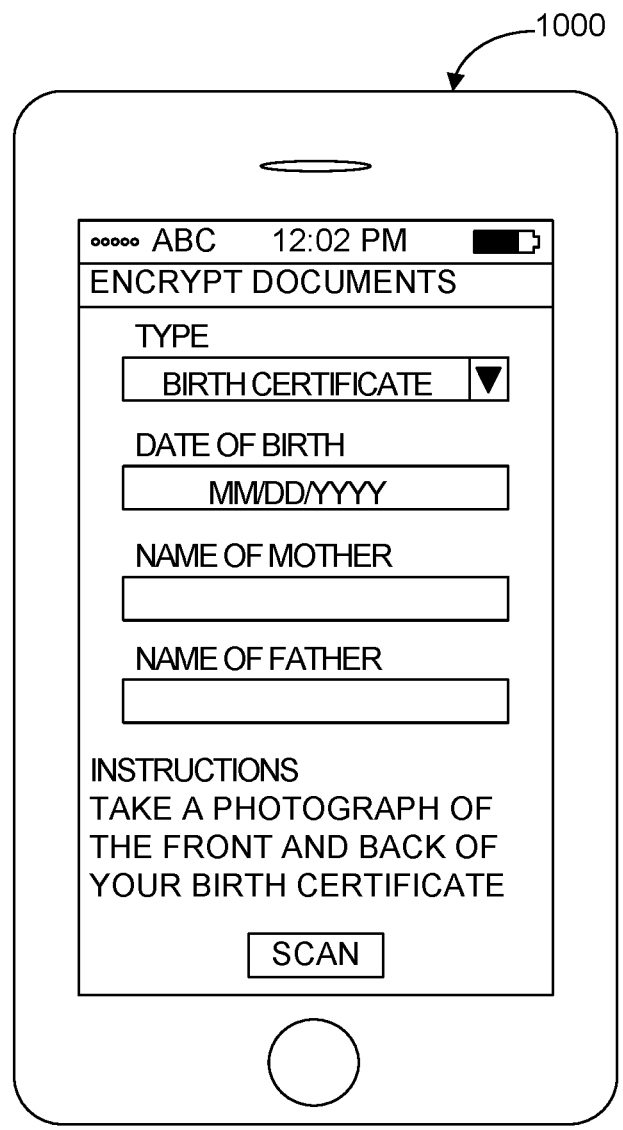

FIGS. 9 and 10 are diagrams of a GUI for receiving the first plurality of ID proof references, where the ID proof reference is a physical document, according to embodiments.

In an embodiment, receiving a first plurality of ID proof references associated with the particular person, in step 410, includes displaying an ID reference entry form as a GUI displayed on an electronic display of the personal electronic device, receiving a designation of an ID reference type via the GUI, and receiving at least one ID reference attribute via the GUI. In an embodiment, receiving a designation of an ID reference type may include receiving a designation of a physical document. In an embodiment, receiving at least one ID reference attribute may include capturing a digital image of the physical document.

In an embodiment, the physical document may include a passport. In another embodiment, the physical document may include a birth certificate. In another embodiment, the physical document may include a Social Security card.

Figure 11:
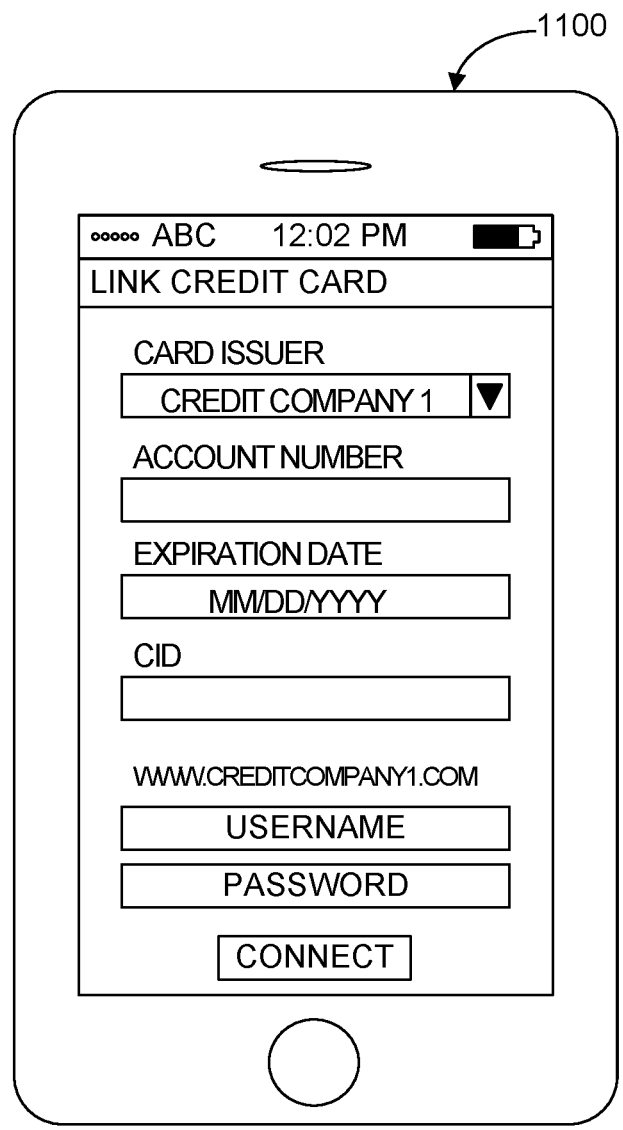
FIGS. 11 and 12 are diagrams of a GUI for receiving the first plurality of ID proof references, where the ID proof reference is an electronic account, according to embodiments.
Figure 12:
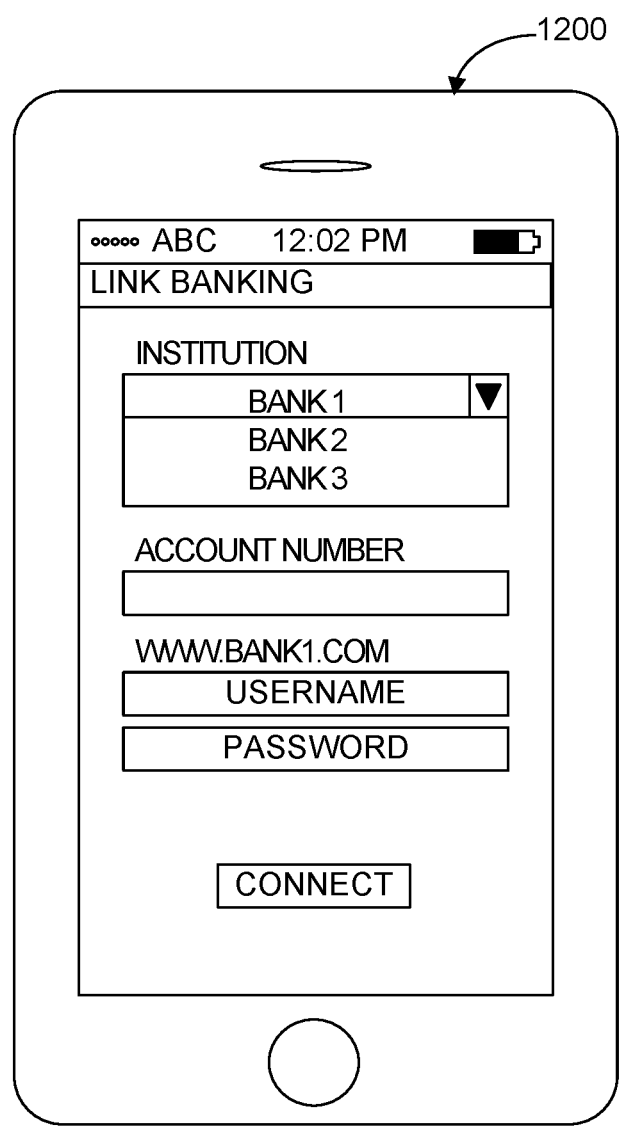

FIGS. 11 and 12 are diagrams 1100, 1200 of a GUI for receiving the first plurality of ID proof references, where the ID proof reference is an electronic account, according to embodiments. According to embodiments, a user may link a digital identity to a non-member institution, as illustrated by the GUIs shown in FIGS. 11 and 12. When customers want to link their identity to an institution that is not participating in the Global Identity Network, the global identity server may use a robot emulator to scrape data. However, most financial institutions have already published APIs to provide more secure alternatives to screen-scrape robots. A link to a member institution may make use of a complete registration protocol with cryptographic proof of identity and auditable permission, wherein the global identity system is able to directly access data corresponding to an account of the person.

In an embodiment, receiving a designation of an ID reference type includes receiving a designation of an electronic account. In an embodiment, receiving at least one ID reference attribute includes receiving an account institution and an account number. In an embodiment, receiving an account institution may include receiving a credit or debit card issuer. In an embodiment, receiving an account institution may include receiving a bank name or a routing number.

In an embodiment, receiving a designation of an electronic account may include receiving a designation of an insurance policy. In an embodiment, receiving the account institution may include receiving the name of the insurance company.

Figure 13:
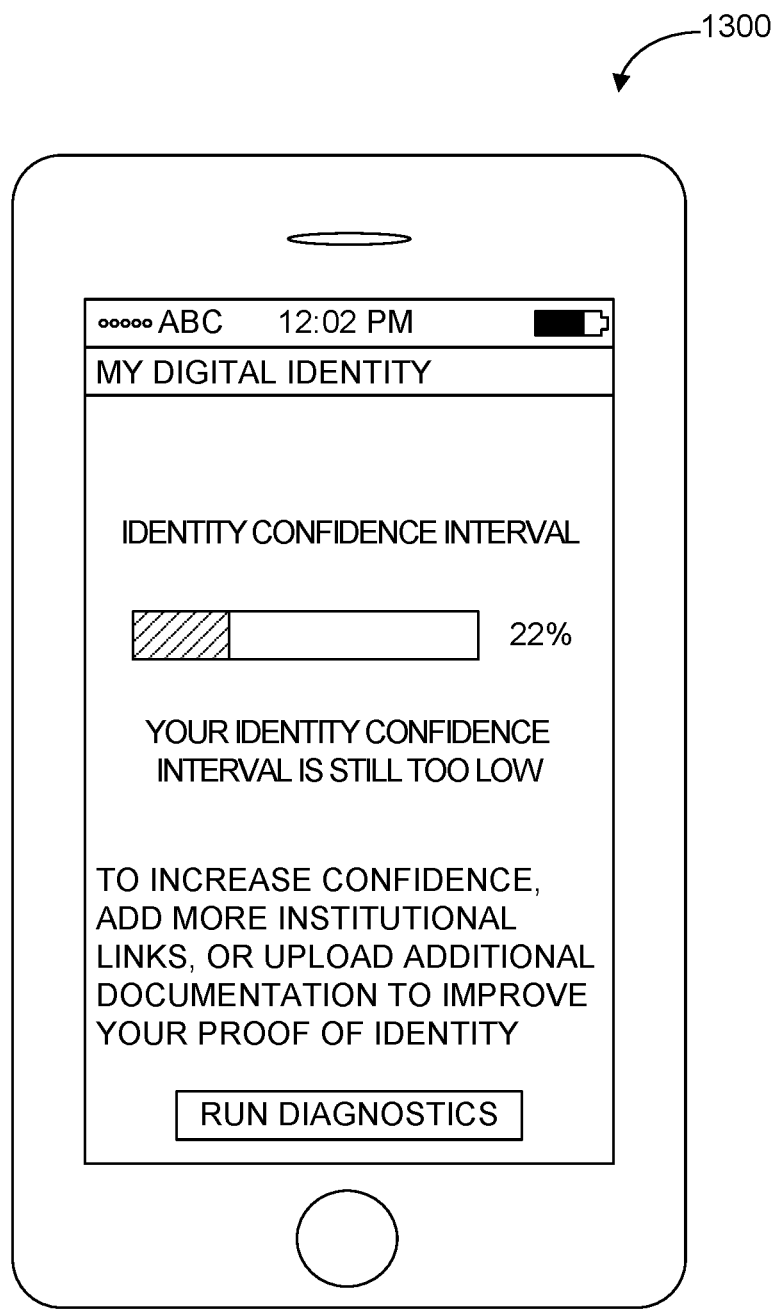
FIG. 13 is a diagram of a GUI for displaying an ID confidence interval to a user, according to an embodiment.

FIG. 13 is a diagram of a GUI 1300 for displaying an ID confidence interval to a user, according to an embodiment.

According to an embodiment, referring again to FIG. 4, the computer method 400 includes analyzing the first plurality of ID proof references associated with the particular person to determine a confidence interval, and displaying the confidence interval to the user via the GUI.

In an embodiment, encrypting the actual name, the personal electronic device identifier, and the first plurality of ID proof references as encrypted ID data, in step 416, includes performing a digital hash of the actual name, the personal electronic device identifier, and the first plurality of ID proof references.

In an embodiment, immutably storing the global ID, the associated encrypted ID data, and the at least one public key for decrypting an ID verification in one or more computer memories, in step 418, includes writing hashed values of the global ID, the associated encrypted ID data, and the at least one public key for decrypting an ID verification to a blockchain as a transaction.

In one embodiment, the blockchain may include a public blockchain. In an embodiment, the public blockchain may include an Etherium blockchain. In an embodiment, the Etherium blockchain may include an ERC20 blockchain.

In an embodiment, the blockchain may include a private blockchain. In another embodiment, the blockchain includes a permissioned blockchain.

Figure 14:
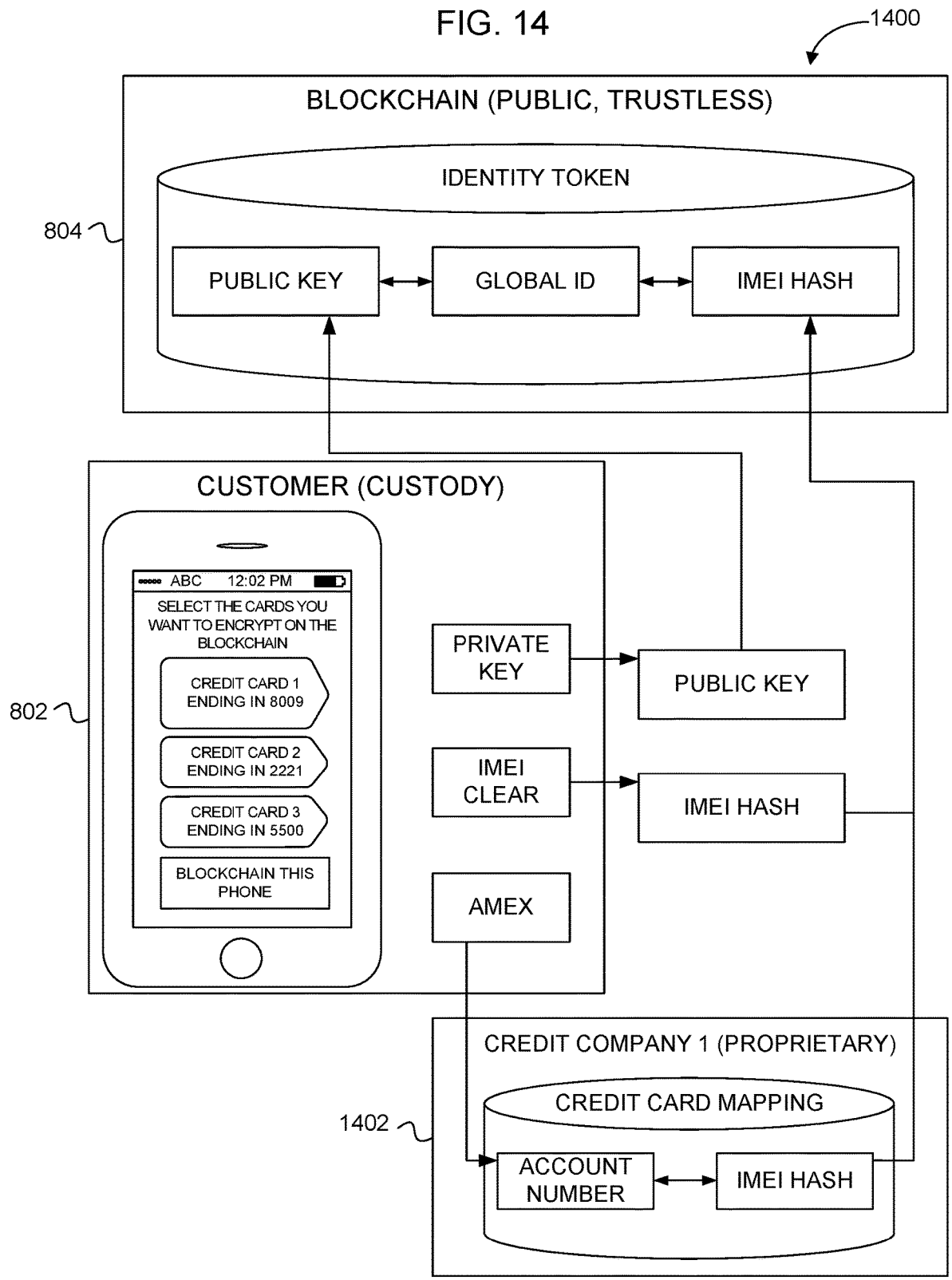
FIG. 14 is a diagram showing relationships between data elements carried by a personal electronic device, a blockchain, and a credit card company server, the credit card company acting as an ID proof reference and with the private key displacing a card not present e-commerce source of payment, according to an embodiment.

FIG. 14 is a diagram 1400 showing relationships between data elements carried by a personal electronic device 802, a blockchain 804, and a credit card company 1402 server, the credit card company 1402 acting as an ID proof reference and with the private key displaying a card not present e-commerce source of payment, according to an embodiment.

Figure 15:
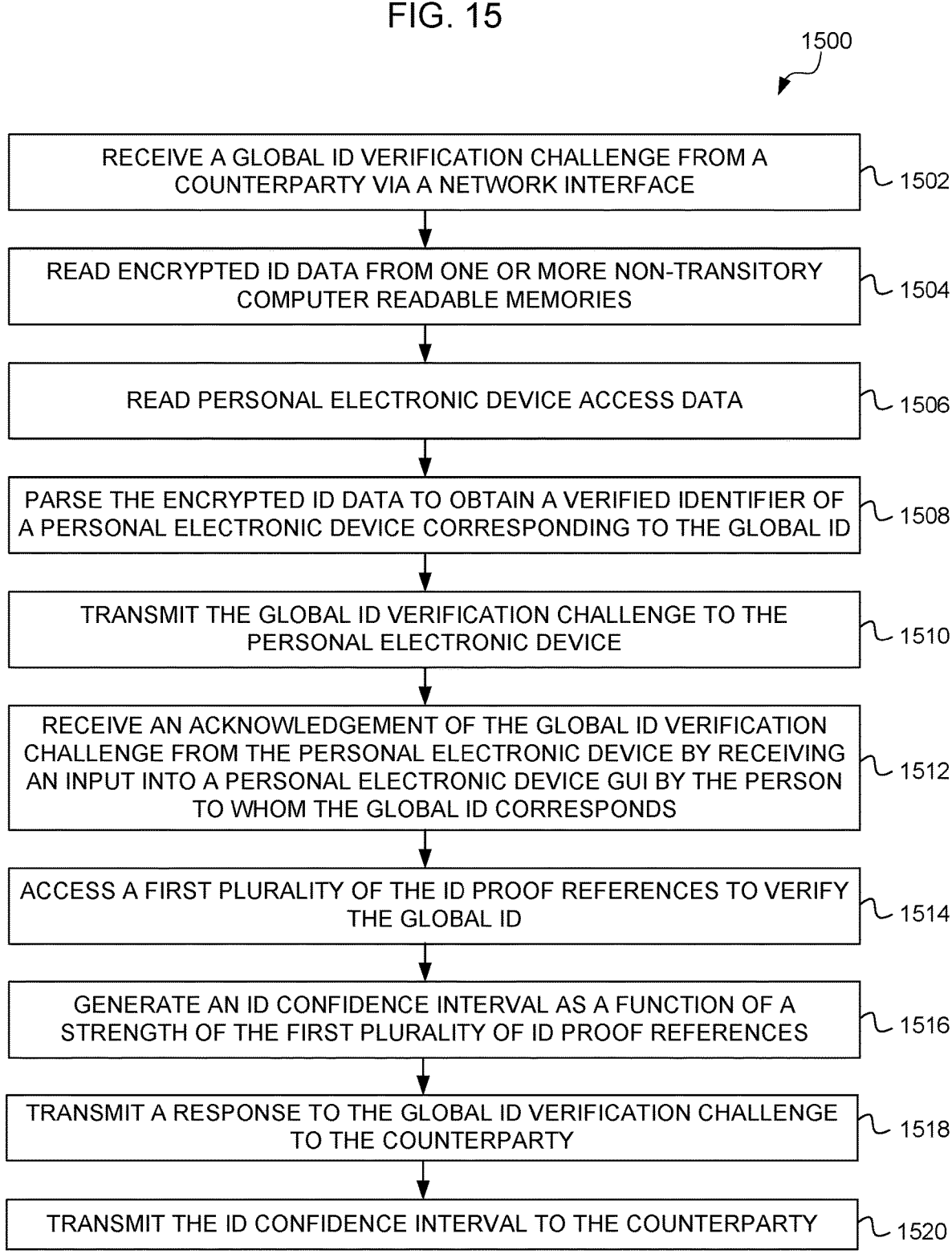
FIG. 15 is a flow chart showing a computer method for verifying a secure identity, according to an embodiment.

FIG. 15 is a flow chart showing a computer method 1500 for verifying a secure identity, according to an embodiment.

According to an embodiment, a computer method 1500 for verifying a secure global identity (ID) includes, in step 1502, receiving, into a server computer, a global ID verification challenge from a counterparty via a network interface. Step 1504 includes reading, with the server computer, encrypted ID data from one or more non-transitory computer readable memories. Step 1508 includes parsing, with the server computer, the encrypted ID data to obtain a verified identifier of a personal electronic device corresponding to the global ID. Step 1510 includes transmitting, from the server computer, the global ID verification challenge to a personal electronic device of a particular person. Step 1512 includes receiving, with the server computer, an acknowledgement of the global ID verification challenge from the personal electronic device via an input into a GUI of the personal electronic device by the particular person to whom the global ID corresponds. Step 1518 includes transmitting, from the server computer, a response to the global ID verification challenge to the counterparty.

In an embodiment, the computer method 1500 further includes, in step 1506, reading, with the server computer, personal electronic device access data.

In an embodiment, the computer method 1500 further includes, in step 1514, accessing, with the server computer, a first plurality of ID proof references to verify the global ID. Step 1516 includes generating, with the server computer, an ID confidence interval as a function of a strength of the first plurality of ID proof references. Step 1520 includes transmitting the ID confidence interval from the server computer to the counterparty.

In an embodiment, the transmitting of the global ID verification challenge to the personal electronic device, in step 1510, includes transmitting a requirement to provide a biometric proof. In an embodiment, the receiving of the acknowledgement of the global ID verification challenge, in step 1512, includes enabling the acknowledgement using the biometric proof.

In an embodiment, the computer method 1500 further includes accessing, with the server computer, a second plurality of ID proof references to verify the global ID; generating, with the server computer, an ID confidence interval as a function of a strength of the second plurality of ID proof references; and transmitting the ID confidence interval from the server computer to the counterparty.

In an embodiment, the transmitting of the global ID verification challenge to the personal electronic device, in step 1510, includes transmitting at least a partial list of the first plurality of ID proof references to the personal electronic device. In an embodiment, the receiving of the acknowledgement of the global ID verification challenge, in step 1512, includes receiving a designation of at least a subset of the at least partial list of the first plurality of ID proof references. In an embodiment, the second plurality of ID proof references is equal to the designated at least a subset of the at least partial list of the first plurality of ID proof references.

In an embodiment, the accessing of the first plurality of the ID proof references to verify the global ID, in step 1514, includes accessing a web page of a first ID proof reference, entering a first account number corresponding to the particular person, screen scraping displayed first account information, and parsing a first attribute of the first account.

In an embodiment, the accessing of the second plurality of the ID proof references to verify the global ID, in step 1514, includes parsing a first attribute associated with a first ID proof reference, parsing a first attribute associated with a second ID proof reference, and comparing the respective first attributes to determine a match between the first attributes.

In one embodiment, the first attributes may include matching residential addresses. In another embodiment, the first attributes may include respective digital photographs of the particular person.

In an embodiment, the accessing of the second plurality of the ID proof references to verify the global ID, in step 1514, includes parsing a first attribute associated with a first ID proof reference, parsing a second attribute associated with a second ID proof reference, and comparing the first and the second attributes to determine a match between the first and the second attributes.

In one embodiment, the first attribute may include a reference to the second attribute associated with the second ID proof reference. The second attribute may form a recursive validation of the first attribute. In another embodiment, the first attribute may include an account number associated with the second ID proof reference.

Figure 16:
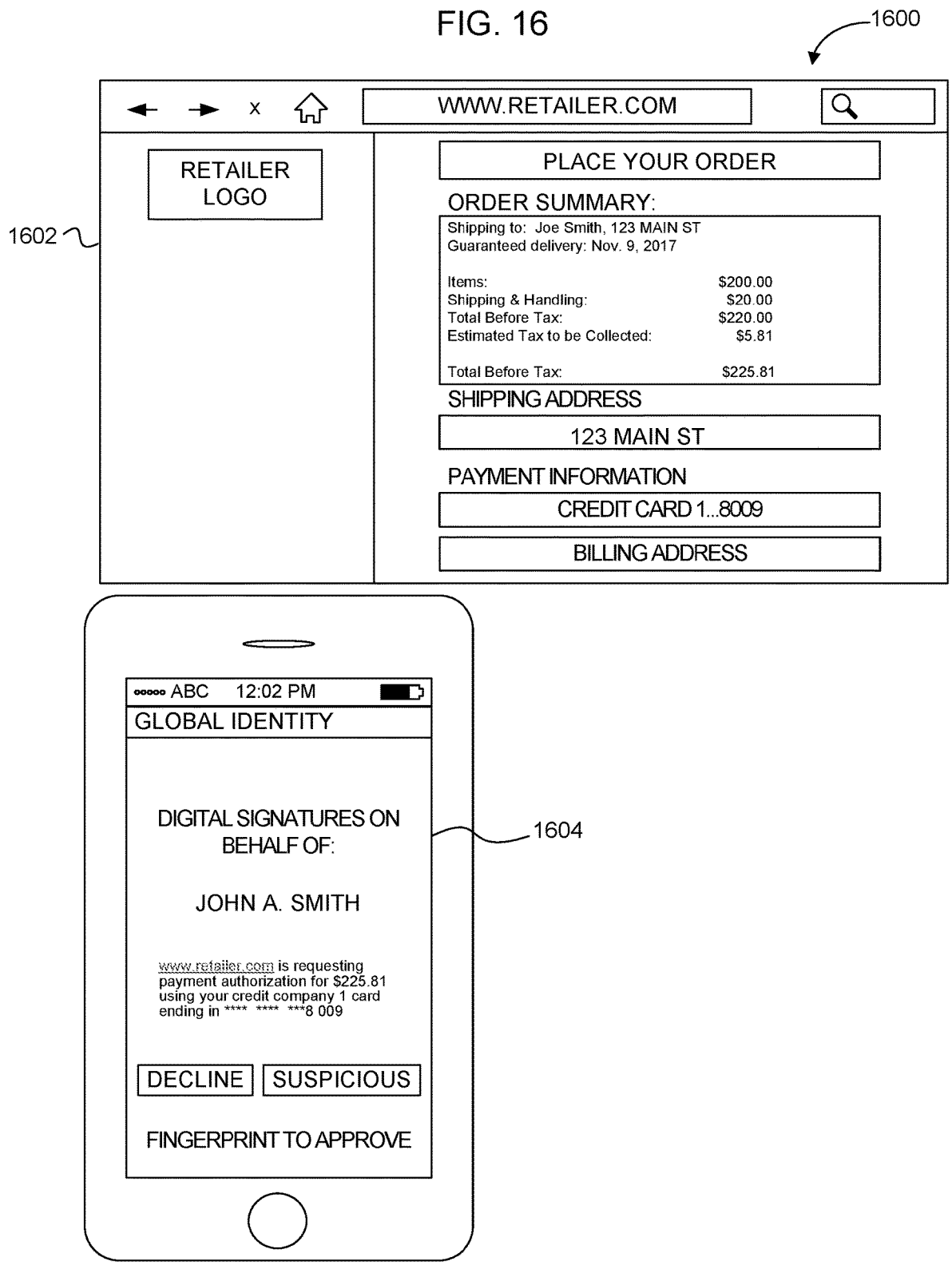
FIG. 16 is a diagram illustrating interactions between an e-commerce retailer's website or application, and a GUI for providing a secure response to a cryptographic identity challenge, according to an embodiment.

FIG. 16 is a diagram 1600 illustrating interactions between an e-commerce retailer's website or application 1602, and a GUI 1604 for providing a secure response to a cryptographic identity challenge, according to an embodiment.

Referring to FIG. 16, the receiving of the acknowledgement of the global ID verification challenge from the personal electronic device, in step 1512, includes authorizing, by the particular person, shopping via an e-commerce website 1602, purchase via the personal electronic device using the GUI 1604. The computer method 1500 is initiated by the particular person selecting a tokenized credit card for payment of the purchase.

Figure 17:
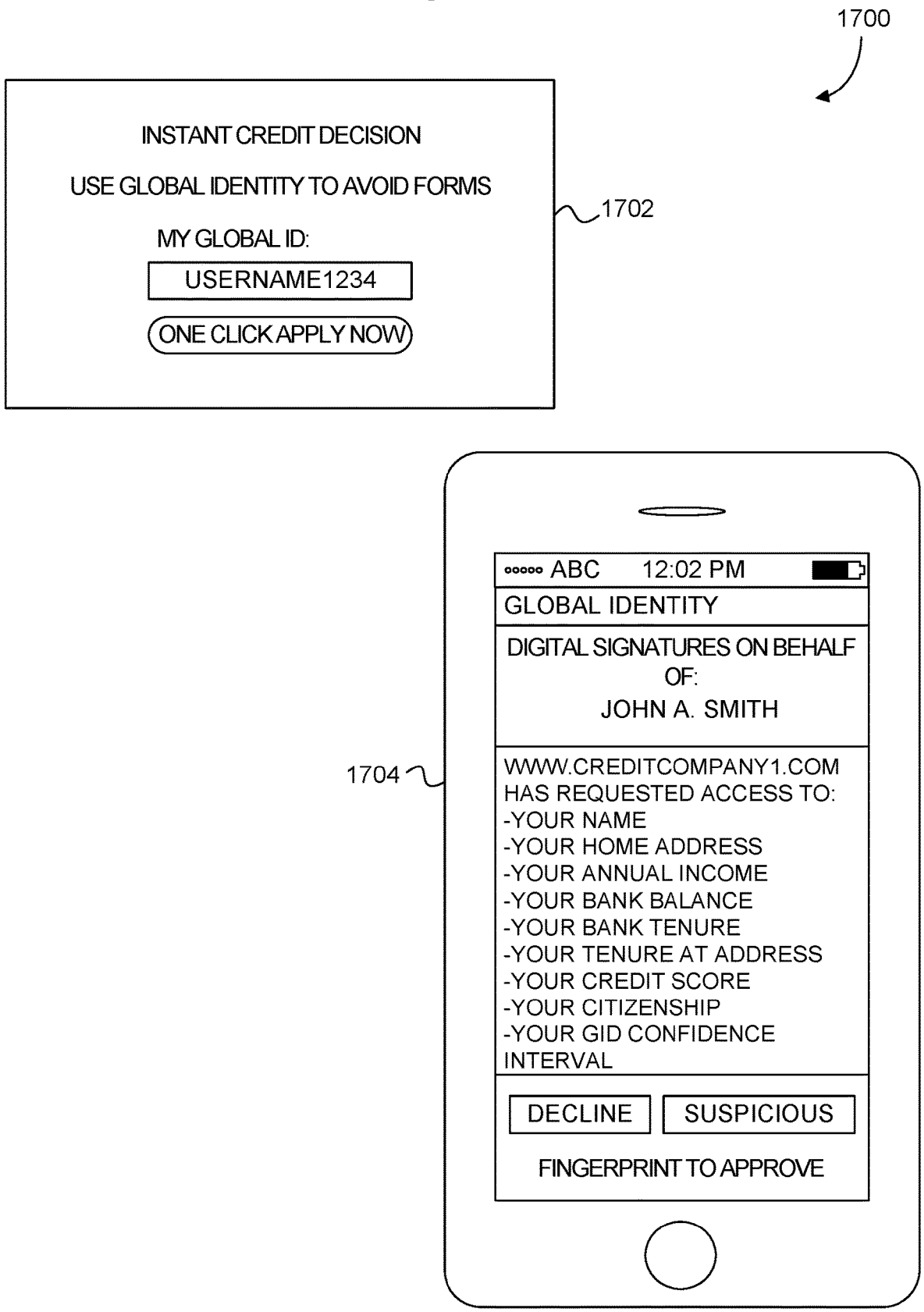
FIG. 17 is a diagram showing GUIs for one click underwriting using a lender's website and a GUI for entering authorization for access to financial information via a response to a digital challenge, according to an embodiment.

FIG. 17 is a diagram 1700 showing GUIs for one click underwriting using a lender's website 1702 and a GUI 1704 for entering authorization for access to financial information via a response to a digital challenge, according to embodiments.

Referring to FIG. 17, the counterparty is a lender. The receiving of the acknowledgement of the global ID verification challenge from the personal electronic device, in step 1512, includes presenting, via the GUI 1704 displayed by the personal electronic device, a list of information from ID references requested by a lender, and receiving, at the server computer, an agreement from the particular person to proceed with providing the information and completing an online application for credit or a loan from the lender.

According to an embodiment, the personal electronic device associated with the particular person includes a personal electronic device that is in sole possession of the particular person. In an embodiment, the personal electronic device includes a personal electronic device configured to be accessed by a biometric characteristic of the particular person.

According to embodiments, possession of a Private Key (information) is replaced with possession of a registered personal electronic device, such as a smartphone as proof of identity. Registration on the blockchain includes publishing a person's private key and registering the person's IMEI (Hardware ID) Hash, according to an embodiment. Registration on the blockchain gives others a way to verify that a transaction was signed by the person, and sent from the person's personal device.

One use of embodiments is related to "know your customer" (KYC) document capture.

A user may scan, upload and encrypt legacy documents to serve as a kernel for a new Digital Identity, as illustrated by the GUIs shown in FIGS. 9 and 10. This may provide a baseline to conform to existing KYC regulations in most global jurisdictions.

Various additional uses are contemplated. For example, the personal device may operate as a digital passport, wherein the user presents their smartphone at an Immigrations Gate and the user authorizes temporary access to their passport using a biometric response to a digital challenge.

Other applications or uses may include:

Security: Everything that is locked automatically unlocks for the right people.

Personalization: The waiter tells you they've received a case of your favorite vintage, even though you've never been to this restaurant before.

Shopping: You can buy anything you see and have it shipped with just a word.

Medical Care: The emergency room lab tech knows that you are allergic to penicillin even though you are unconscious.

Everyday: The teacher knows that you gave your neighbor permission to pick your kid up from school today.

Legal and Finance: You can refinance your home from your phone, without forms or paperwork.

Job Application: With your consent, your prospective employer can verify your work history and academic record in an instant.

According to embodiments, a protocol for enabling communications related to ID management may include several commands and responses. Some commands may include:

Publish new Identity

Upload KYC Document

Link an Institution

Perform Digital Challenge

Request Data Permission

Grant Data Permission

Publish Document for Signature

Linking an institution may include several steps. (Conceptually, this is similar in mechanism to "Friending" someone on a social medium):

1. User formats Link Request with:
   a. target's Global ID;
   b. Permission to access identity data packet;
   c. (optional) Nickname: foreign key that represents the Target on User's application;
   d. (optional) Account ID: foreign keys to Target's proprietary application.
2. User encrypts the LinkRequest with their Private Key.
3. Target verifies authenticity using User's Global ID→Public Keys.
4. Target uses the Permission to retrieve Identity data packet.
5. Target interrogates data packet to substantiate the User's functional data.
6. Target cross-references functional data against User-provided foreign keys to satisfy their proprietary KYC and anti-fraud processes.
7. Target accepts LinkRequest.
   a. Returns their foreign keys and method access path.
8. (else) Target declines LinkRequest.
   a. Error message.

Verifying authenticity of an ID using methods herein may include inputting:

Global ID, an Encrypted Message, and a Clear Message.

The computer executes

1. Lookup Public Keys on BC
2. Apply Public Keys to Encrypted Message
3. (if decrypted message==clear message) return TRUE else FALSE According to embodiments, there are several core design principles that are contemplated for the disclosed system and methods presented herein:

Self-Sovereign: The private data which makes up a Digital Identity should remain entirely in the control of the individual whose identity is described.

Delegated Data: a decentralized, permission-based protocol delegates the storage and maintenance of identity data to the institutions which are actively engaged in the lives of users.

Cryptographic Proofs: Public/Private key cryptography affirms that each active User and Institution is precisely who they claim to be, and to enforce the privileges and rights of each.

Personal Device: A Personal Computing Device with a Secure Element, registered to be in the possession of the User serves as a reference form factor.

Probabilistic Identity: Fraud may be prevented by scoring each digital proof with a Confidence Interval to represent the degree of certainty, allowing parties to set their own policies and tolerance for risk.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for verifying a secure global identity (ID), comprising:
   receiving, into a server computer, a global ID verification challenge from a counterparty via a network interface;
   reading, with the server computer, encrypted ID data from one or more non-transitory computer readable memories;
   transmitting, from the server computer, the global ID verification challenge to a personal electronic device of a particular person;
   receiving, with the server computer, an acknowledgement of the global ID verification challenge from the personal electronic device via an input into a GUI of the personal electronic device by the particular person to whom the global ID corresponds; and
   transmitting, from the server computer, a response to the global ID verification challenge to the counterparty.

2. The computer method for verifying a secure global ID of claim 1, further comprising:
   reading, with the server computer, personal electronic device access data.

3. The computer method for verifying a secure global ID of claim 1, further comprising:
   parsing, with the server computer, the encrypted ID data to obtain a verified identifier of a personal electronic device corresponding to the global ID.

4. The computer method for verifying a secure global ID of claim 1, further comprising:
   accessing, with the server computer, a first plurality of ID proof references to verify the global ID;
   generating, with the server computer, an ID confidence interval as a function of a strength of the first plurality of ID proof references; and
   transmitting the ID confidence interval from the server computer to the counterparty.

5. The computer method for verifying a secure global ID of claim 1, wherein the transmitting of the global ID verification challenge to the personal electronic device comprises transmitting a requirement to provide a biometric proof; and
   wherein the receiving of the acknowledgement of the global ID verification challenge comprises enabling the acknowledgement using the biometric proof.

6. The computer method for verifying a secure global ID of claim 4, further including:
   accessing, with the server computer, a second plurality of ID proof references to verify the global ID;
   generating, with the server computer, an ID confidence interval as a function of a strength of the second plurality of ID proof references; and
   transmitting the ID confidence interval from the server computer to the counterparty.

7. The computer method for verifying a secure global ID of claim 4, wherein the accessing of the first plurality of the ID proof references to verify the global ID comprises:
   accessing a web page of a first ID proof reference;
   entering a first account number corresponding to the particular person;
   screen scraping displayed first account information; and
   parsing a first attribute of the first account.

8. The computer method for verifying a secure global ID of claim 6, wherein the transmitting of the global ID verification challenge to the personal electronic device includes transmitting at least a partial list of the first plurality of ID proof references to the personal electronic device;
   wherein the receiving of the acknowledgement includes receiving a designation of at least a subset of the at least partial list of the first plurality of ID proof references; and
   wherein the second plurality of ID proof references is equal to the designated at least a subset of the at least partial list of the first plurality of ID proof references.

9. The computer method for verifying a secure global ID of claim 6, wherein the accessing of the second plurality of the ID proof references to verify the global ID comprises:
   parsing a first attribute associated with a first ID proof reference;
   parsing a first attribute associated with a second ID proof reference; and
   comparing the respective first attributes to determine a match between the first attributes.

10. The computer method for verifying a secure global ID of claim 9, wherein the first attributes comprise matching residential addresses.

11. The computer method for verifying a secure global ID of claim 9, wherein the first attributes comprise respective digital photographs of the particular person.

12. The computer method for verifying a secure global ID of claim 6, wherein the accessing of the second plurality of the ID proof references to verify the global ID comprises:
   parsing a first attribute associated with a first ID proof reference;
   parsing a second attribute associated with a second ID proof reference; and
   comparing the first and the second attributes to determine a match between the first and the second attributes.

13. The computer method for verifying a secure global ID of claim 12, wherein the first attribute comprises a reference to the second attribute associated with the second ID proof reference;
   whereby the second attribute forms a recursive validation of the first attribute.

14. The computer method for verifying a secure global ID of claim 13, wherein the first attribute comprises an account number associated with the second ID proof reference.

15. The computer method for verifying a secure global ID of claim 1, wherein the receiving of the acknowledgement of the global ID verification challenge from the personal electronic device includes authorizing, by the particular person, shopping via an e-commerce website, a purchase via the personal electronic device using the GUI, wherein the method is initiated by the particular person selecting a tokenized credit card for payment of the purchase.

16. The computer method for verifying a secure global ID of claim 1,
   wherein the counterparty is a lender, and
   receiving of the acknowledgement of the global ID verification challenge from the personal electronic device comprises:
      presenting, via a GUI displayed by the personal electronic device, a list of information from ID references requested by a lender; and
   receiving, at the server computer, an agreement from the particular person to proceed with providing the information and completing an online application for credit or a loan from the lender.

* * * * *